United States Patent [19]

Sue

[11] 4,387,384

[45] Jun. 7, 1983

[54] RECORDING DEVICE

[75] Inventor: Takaji Sue, Hadano, Japan

[73] Assignee: Ricoh Co., Ltd., Tokyo, Japan

[21] Appl. No.: 205,952

[22] Filed: Nov. 12, 1980

[30] Foreign Application Priority Data

Nov. 27, 1979 [JP] Japan ................................ 54-153445

[51] Int. Cl.$^3$ ................................................ G01D 15/16
[52] U.S. Cl. .................................. 346/140 R; 400/124
[58] Field of Search ...................... 346/140 R, 141, 21; 400/124

[56] References Cited

U.S. PATENT DOCUMENTS 1,360,823 11/1920 Thwing .......................... 346/140 X
3,329,964 7/1967 Mutschler ...................... 346/140 X
4,194,846 3/1980 Zerillo ................................ 400/124

OTHER PUBLICATIONS

Cross, R. G.; Ribbonless Ink Printer; IBM TDB, vol. 16, No. 1, Jun. 1973, p. 310.
Jablonski, R. B.; Pneumatic Ink Printing; IBM TDB, vol. 17, No. 2, Jul. 1974, pp. 402–403.

*Primary Examiner*—Joseph W. Hartary
*Attorney, Agent, or Firm*—Burgess, Ryan and Wayne

[57] ABSTRACT

Characters, numerals and other symbols are formed with dots placed on a recording paper by a printing stylus thrust through a thin ink film formed in front of the recording paper.

3 Claims, 7 Drawing Figures

FIG. 1
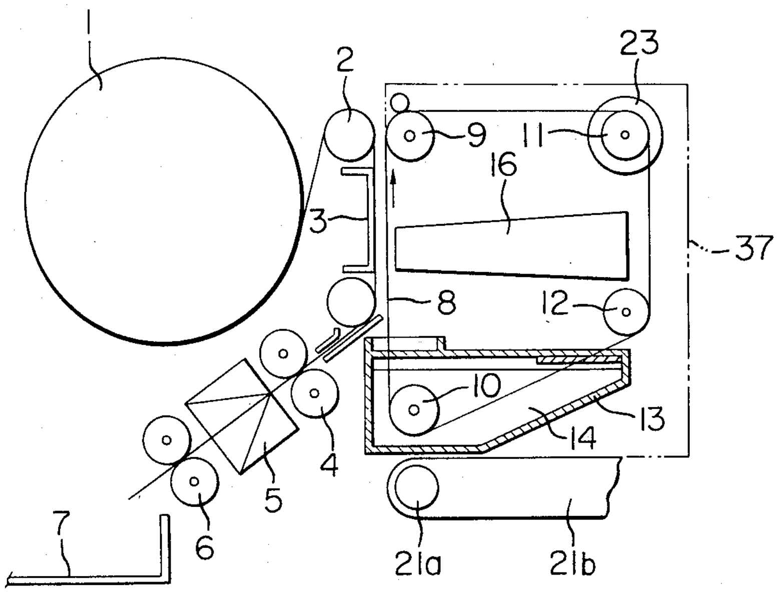
FIG. 3
FIG. 2
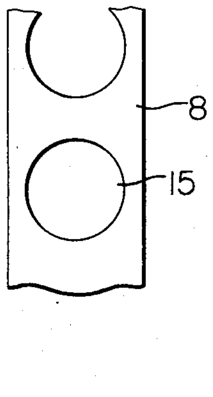
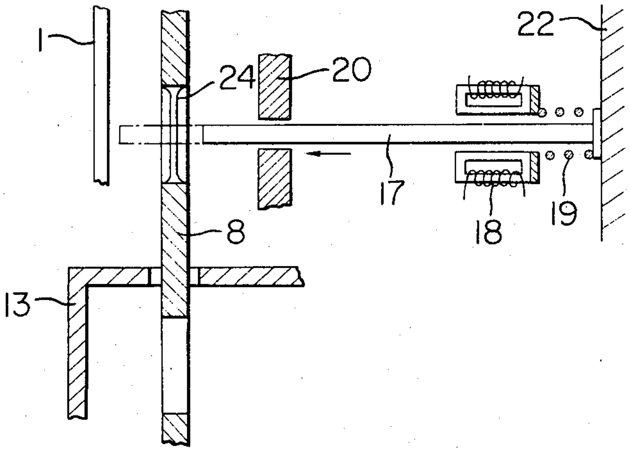

RECORDING DEVICE

BACKGROUND OF THE INVENTION

The present invention relates to a recording device of the type forming characters, numerals and other symbols with dots left on a recording paper by a printing stylus thrust through a thin ink film formed in front of the recording paper.

In order to print characters, numerals, symbols and other patterns with ink dots directly placed on a recording paper, there have been devised and demonstrated the ink-jet printers of the type in which the ink drops are ejected through a nozzle and the wire printers in which wires are thrust against a recording paper through an ink ribbon. However, the ink-jet printers have some problems. Firstly, when they are not used, the ink is evaporated, thus clogging the nozzle. Secondly, because of the difficulties encountered in the fabrication of nozzles and in order to prevent clogging, the nozzles cannot be reduced in diameter beyond a certain limit. As a result, the ink drops and subsequently ink dots placed on the recording paper cannot be reduced in diameter beyond a certain limit, so that the resolution cannot be improved. The wire printers also have problems. Firstly, since wires are thrust against the cloth ribbon, the latter is damaged when the wires are reduced in diameter, so that no dot is formed. Secondly, the wires encounter considerable resistance when they are thrust against the ribbon.

SUMMARY OF THE INVENTION

The present invention was made to overcome the above and other problems encountered in the conventional ink-jet printers and wire printers and has for its object to provide a recording or printing device of the type for recording or printing characters, numerals and other symbols with ink dots placed on a recording paper by a printing stylus thrust against the latter through a thin ink film formed in front of the recording paper.

BRIEF DESCRIPTION OF THE DRAWINGS

FIG. 1 is a side view in section of a first embodiment of the present invention;

FIG. 2 is a fragmentary top view of an endless ribbon or belt used in the first embodiment;

FIG. 3 is a side view in section of a printing stylus unit of the first embodiment;

DESCRIPTION OF THE PREFERRED EMBODIMENTS

First Embodiment, FIGS. 1 through 3

Figure 4A:
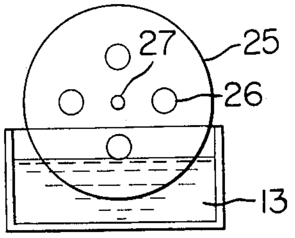
FIG. 4A is a front view of a second embodiment of the present invention.

Referring first to FIG. 1, recording paper 1 is unrolled, guided by a guide roller 2, which also serves to correct curls of the recording paper 1, transported in front of a guide plate 3 and fed to a first feed roller pair 4. After leaving the first feed roller pair 4, the recording paper 1 is cut by a cutter 5 and fed by a second feed roller pair 6 into a stacking tray 7.

An endless thin ribbon or belt 8 is guided by guide rollers 9, 10, 11 and 12 in such a way that the endless ribbon or belt 8 is transported in parallel with the recording paper 1 transported along the guide plate 3. The guide roller 10 is disposed within an ink reservoir 13 filled with ink 14 so that the endless ribbon or belt 8 passes through the ink reservoir 13 and consequently is coated with the ink films as it is transported in the direction opposite to that of the transport of the recording paper as indicated by the arrow. As shown in FIG. 2, the endless ribbon or belt 8 is provided with a plurality of equally spaced, punched circular holes 15 which may be in any other suitable form so that when the endless ribbon or belt 8 leaves the ink reservoir 13 in the direction shown by the arrow, a thin ink film 24 fills each hole 15.

Referring to FIGS. 1 and 3, a printing stylus unit 16 is disposed in opposed relationship with the guide plate 3 and comprises, as best shown in FIG. 3, a printing stylus 17, a solenoid 18 and a return spring 19. One end of the bias spring 19 is securely joined to the solenoid 18 while the other end is made fast to the flanged end of the printing stylus 17. When the printing signal is applied to the solenoid 18; that is, when the solenoid 18 is energized, the printing stylus 17 is pushed through a stylus guide 20 toward the recording paper 1 as indicated by the arrow and two-dot chain lines, but when no signal is applied to the solenoid 18, the printing stylus 17 remains in the inoperative position under the force of the bias spring 19 with the flanged end of the printing stylus 17 abutting against a stopper 22.

Next the mode of operation of the first embodiment with the above-described construction will be described. The recording paper 1 is intermittently transported over the guide plate 3 while the endless ribbon or belt 8 is also intermittently transported in the opposite direction by a motor 23 attached to the roller 11. As described above, when the endless ribbon or belt 8 leaves the ink reservoir 13, its holes 15 are covered with the thin ink films 24 because of the viscosity and surface tension of the ink 14. The endless ribbon or belt 8 is intermittently stopped in such a way that the film covered hole 15 is positioned in opposed relationship with the printing end of the stylus 17. When the printing signal is applied to the printing stylus unit 16, the solenoid 18 is energized so that the printing stylus 17 is pushed in the direction indicated by the arrow (See FIG. 3). As a result, the printing stylus passes through the thin ink film 24 and the ink carried on the printing end of the stylus 17 is placed as an ink dot on the recording paper 1, the diameter of the ink dot being depending upon that of the printing end of the stylus 17. Thereafter, the printing stylus 17 is immediately returned to the inoperative position under the force of the return spring 19 as the duration of the printing signal is very short in synchronism with the displacement of the print head 37 in the direction of main scanning. The above-described ink dot placement step is repeated many times, thereby printing characters. The thin ink film 24 remains intact even when a line of ink dots is printed. Therefore, when another line is to be printed, the next hole 15 with the thin ink film 24 is brought to the printing position.

The endless ribbon or belt 8 may have a predetermined length of unpunched portion; that is, the portion having no hole 15. A mark is attached to the endless ribbon or belt 8 in such a way that when the recording device is not used, the unpunched portion of the endless ribbon or belt 8 may be extended from the ink reservoir 13 to the guide roller 11 by detecting the mark by a suitable detecting means (not shown). Then the scattering of ink can be avoided.

The endless ribbon or belt 8 is made of flexible plastic or steel.

In FIG. 1, 21*a* is a guide shaft and 21*b*, a carrier moved along the guide shaft 21*a*. A print head 37 including the ink reservoir 13 and the printing stylus unit 16 carried on the carrier 21*b* is displaced transversely of the recording paper 1.

In summary, according to the first embodiment of the present invention, the problem that no ink dot is placed because of the evaporation of ink can be eliminated. When the printing stylus 17 passes through the thin ink film 24, it encounters no resistance so that it can be reciprocated very quickly. In addition, the printing stylus 17 can be made smaller in diameter so that the resolution can be much improved.

Second Embodiment, FIG. 4

Figure 4B:
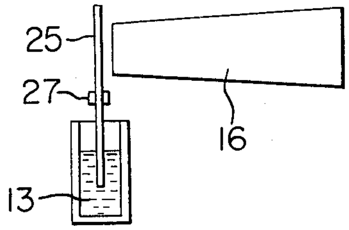
FIG. 4B is a side view thereof.

The second embodiment shown in FIG. 4 is different from the first embodiment in that instead of the endless ribbon or belt 8, a disk 25 is used which is formed with a plurality of coaxial holes 26 about the shaft 27. A part of the disk is immersed into the ink in the reservoir 13 and the disk 25 is intermittently rotated about the shaft 27 in such a way that the hole 26 is positioned in opposed relationship with the printing end of the stylus 17 as best shown in FIG. 4B.

Figure 5:
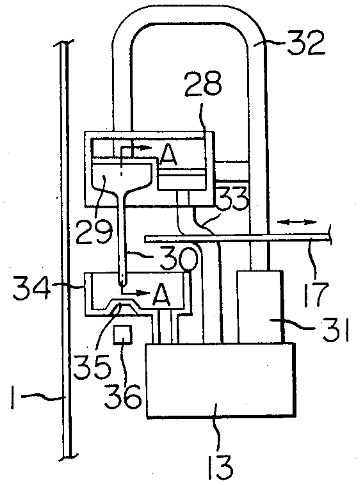
FIG. 5 is a side view, partly in section, of a third embodiment of the present invention.
Figure 6:
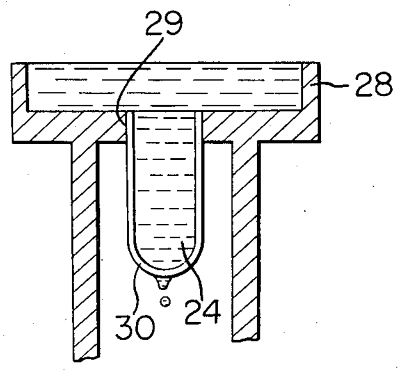
FIG. 6 is a sectional view taken along the line A—A of FIG. 5.

Third Embodiment, FIGS. 5 and 6

The third embodiment shown in FIGS. 5 and 6 is different from the first and second embodiments in that the thin ink film 24 is continuously or always formed.

More specifically, as shown in FIG. 6, a slot 29 is formed through the bottom of an ink manifold 28 and the upper ends of the legs of a U-shaped ring 30 are inserted into the slot 29. Therefore, the ink flows through the slot 29 to the U-shaped ring 30, forming the thin ink film 24. The printing stylus 17 prints a dot on the recording paper 1 through the thin ink film 24. The thin ink film 24 is immediately formed every time when the printing stylus 17 makes one reciprocation.

The ink is pumped up from the ink reservoir 13 by a pump 31 and fed through an ink feed tube 32 into the ink manifold 28 in such way that rupturing of the thin ink film 24 is avoided. In order to maintain the flow rate of the ink film 24 falling along the U-shaped ring 30, the liquid level of the ink in the manifold 28 is maintained at a predetermined level and the overflow is returned through a return line 33 into the reservoir 13. The ink drops falling from the U-shaped ring 30 are collected in a reservoir 34 and returned to the reservoir 13. The portion immediately below the U-shaped ring 30 is raised as indicated by 35 and the raised portion 35 is transparent. Alternatively, the reservoir 34 may be made of a transparent material. A photosensor 36 is positioned immediately below the raised portion 35 so as to detect whether or not the ink is being supplied to the U-shaped ring 30.

The mode of operation of the third embodiment with the above-described construction is substantially similar to that of the first embodiment. The printing stylus 17 passes through the ink film 24 and leaves an ink dot on the recording paper 1. When the recording or printing device is not used, the supply of ink to the ink manifold 28 is suspended so that the ink in the manifold 28 is returned to the reservoir 13 through the ring 30 and the reservoir 34 and consequently the evaporation of ink can be prevented. In the embodiment of FIG. 5, it is preferable that the main and sub-scannings are realized by the movements of the printing paper only.

In summary, according to the present invention, a thin ink film is formed in front of a recording paper and a printing stylus is driven through this thin ink film to strike against the recording paper, thus, leaving an ink dot on it. When the printing stylus is reduced in diameter, the resolution can be improved accordingly. In addition, plural styli different in diameter from each other may be used so that when shadow areas are printed, the stylus of a larger diameter is used, thereby reducing the number of ink dot placements. Furthermore, since the printing stylus encounters almost negligible resistance when it passes through the thin ink film so that the printing stylus driving force can be considerably reduced as compared with the conventional wire printers in which each wire must be thrust through an ink ribbon. Moreover, the printing stylus can be reduced both in diameter and weight so that it can be reciprocated at a high speed and consequently a high printing speed can be attained.

What is claimed is:

1. A recording device for utilizing liquid ink in the impact printing of characters, comprising:

a reservoir adapted to receive a liquid ink;

means for maintaining a desired level of ink in said reservoir;

an open generally U-shaped vertically oriented ring depending from the bottom of said reservoir, with the opening of said ring being in communication with the ink within said reservoir, said ring being dimensioned to form a thin film of liquid ink therein and to retain said film by surface tension effects, in such a manner that ink constantly flows from said reservoir through said ring via said film and drips from the bottom of said ring;

means for disposing a record medium adjacent said ring and in juxtaposition with said thin ink film; and a printing stylus adjacent said ring and adapted to be thrust through said thin ink film and against said record medium, to transport a part of said thin ink film to said record medium in accordance with a desired character to be printed.

2. The device according to claim 1, further comprising means for returning to said reservoir ink which drips from the bottom of said ring.

3. The device according to claim 1 or 2, further comprising means for detecting whether or not ink is being supplied from said reservoir to said ring.

* * * * *